Aug. 23, 1927.
W. O. WHITE
PELORUS
Filed Aug. 23, 1924
1,640,166
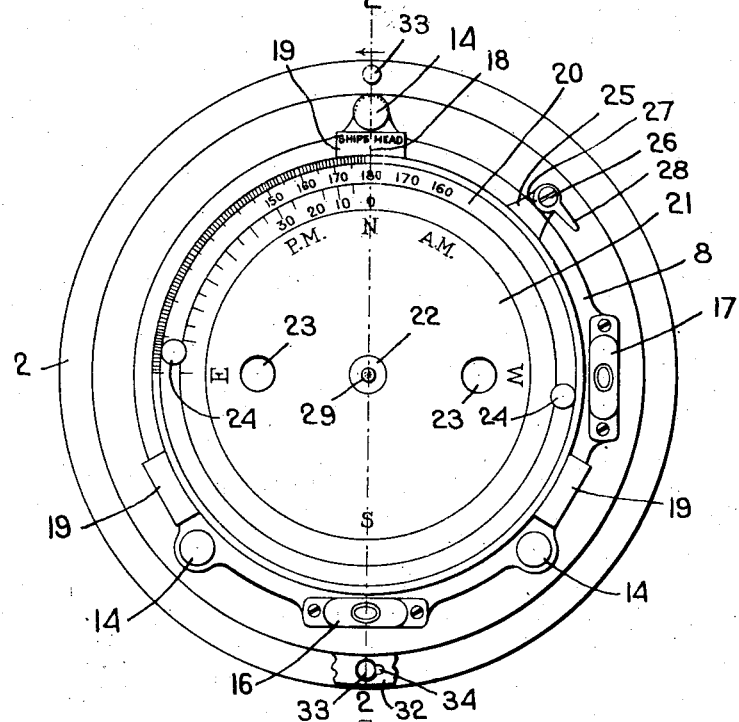
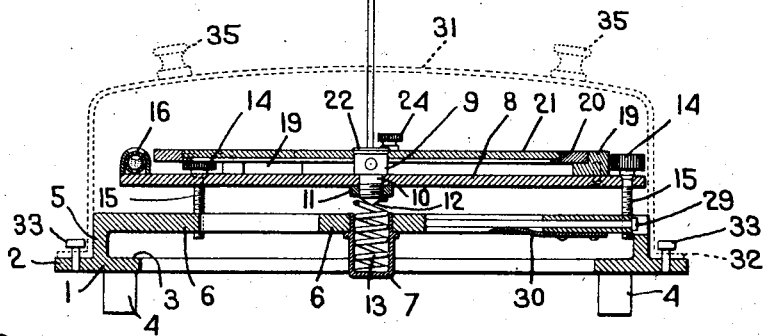
Inventor.
Wilfrid O. White
by Heard Smith & Tennant
Attys.

Patented Aug. 23, 1927.

1,640,166

UNITED STATES PATENT OFFICE.

WILFRID O. WHITE, OF NEWTON, MASSACHUSETTS.

PELORUS.

Application filed August 23, 1924. Serial No. 733,683.

This invention relates to a pelorus and the object of the invention is primarily to provide an instrument suitable for aviation purposes.

The object of the invention is further to provide a pelorus which shall be of small, light and compact form and weight so that it will take up very little space and be readily available for aviation or other purposes where a minimum of space and weight is permissible.

The ordinary type of pelorus is a comparatively large and heavy instrument. It is usually hung in a gimbal suspension with a heavy counterpoised weight enabling it to remain level on board a vessel.

The present invention provides a pelorus made up of thin, flat plates, disks and dials and a closely fitting hollow protective cover in which the leveling feature is provided by a three-point suspension system enabling the instrument to be leveled without the use of the usual heavy counterpoised weight.

The invention has as its further object to provide a simple, strong, accurate construction, small and compact in form and of very light weight.

These and other objects and features of the invention will appear more fully from the accompanying description and drawings and will be particularly pointed out in the claims.

The drawings show a simple and preferred form of the invention as designed for use in aviation.

In the drawings:

Fig. 1 is a top plan view of the device with the cover removed;

Fig. 2 is a view in central vertical section taken on the line 2—2 of Fig. 1 with the cover indicated in dotted lines;

Fig. 3 is a side elevation on a small scale of the device with the cover in place.

The base of the instrument is flat and preferably circular in shape. It is preferably formed from a light weight metal shaped and skeletonized to give it sufficient rigidity with a minimum amount of weight. As shown, the base comprises an annular portion 1 presenting an external flat circular flange 2 and an internal circular flange 3. At suitable points short legs or standards 4 are secured to or formed integral with the annular portion 1 and adapt the instrument to rest upon a table or other flat support. A short vertical rib 5 is formed centrally and concentrically of the annular portion 1 and carries, preferably integral therewith, a central spider structure 6.

The spider 6 has mounted in the center thereof a vertical seat or socket 7. This may be made of sheet metal and spun onto the spider member as shown in Fig. 2. The whole base, it will thus be seen, is comparatively thin and is flat and light in weight.

A plate 8 of generally circular shape is supported at a slight distance from the base in general parallelism therewith. This plate carries the graduated dials of the pelorus and is provided with suitable means by which it may be leveled. In the preferred construction illustrated the plate has secured therein a central vertical stud. As illustrated, this stud 9 is provided with a shank 10 passing through a central aperture in the plate and clamped thereto by a nut 11 on its lower threaded portion. The lower end of the stud 9 is of conical or convex shape as shown at 12 and seats in the upper end of a helical compression spring 13 seated in the socket member 7. There is thus formed a yielding, pivotal, central support for the plate and the parts carried thereby. In order to level the plate a plurality of leveling screws are provided. As shown there are three of these leveling screws, thus providing a three-point suspension feature. Each leveling screw 14 is provided with a milled head and has its shank 15 passing through an aperture near the periphery of the plate 8 and threaded into the spider portion of the base. Two levels 16 and 17, such as spirit-levels, are mounted on the plate at right angles to each other. Thus by observing the levels and turning the leveling screws 14 the plate is readily leveled. The spring 13 which tends to separate the plate from the base acts to prevent any lost motion and to render the operation of adjusting accurate.

An index line 18 on the plate indicates the fore and aft line of the aeroplane or vessel upon which the device is to be used. Upon the plate are mounted an azimuth graduated dial and a compass graduated dial in parallelism with the plate and concentrically and rotarily adjustable with respect to the plate and with respect to each other. For this purpose, as shown, the plate carries a plurality, here shown as three in number, of annular rabbeted, arcuate seats 19. The azimuth dial 20 is shown as the outer dial and is seated in the rabbeted portion of the seats 19. It is graduated in the usual manner. This dial is itself rabbeted at its inner edge and forms the seat for the compass graduated dial 21 which is thus a circular disk. The stud 9 is headed at 22 so as to overlie the dial 21 and thus hold it in place, and this dial 21 in turn holds the dial 20 in place. Finger-holes 23 are provided in the dial 20 to facilitate the adjusting operation. This compass dial 21 is graduated in the usual manner.

The azimuth and compass dials are clamped in adjusted position in any suitable manner. As shown, clamping screws 24 are provided threaded into the dial 20 and overlapping the edge of the dial 21. The two dials when thus clamped together are in turn clamped in adjusted position with respect to the plate by any suitable means. As shown, a shoe 25 seats against the edge of the dial 20 and is mounted to slide radially on a stud 26 mounted in a projection from the plate 8. An eccentric 27, provided with a handle 28, is mounted on the stud 26 and abuts a shoulder on the shoe. Hence by swinging the handle 28 the dial 20 may be clamped to or unclamped from the plate. The stud 9 is provided with an axial, vertical socket to receive a shadow pin 29. When not in use the shadow pins may be stored in radial apertures in the spider of the base and prevented from slipping out by a light clamping spring 30.

The operation of the instrument is apparent. The instrument is placed upon a table or other level support on the aeroplane or vessel with the index line 18 in or parallel with the fore and aft line of the vessel. The plate is then brought to a true level by the use of the leveling screws 14. The shadow pin is inserted in its socket. An azimuth observation is taken as, for example, on the sun. The north or zero point of the compass dial is set in line with the 180° point of the azimuth dial, the dials are clamped together, and the azimuth dial carrying therewith the compass dial is set with the proper azimuth reading at the index 18. A shadow cast by the shadow pin will then give the true course of the vessel. If the magnetic course is desired the compass dial is first set with respect to the azimuth dial to correspond with the proper magnetic variation.

The entire instrument is protected by a suitable cover 31 of sheet metal. This cover closely encloses the plate and dials and is provided with an annular flange 32 at the bottom fitting against the flange 2 of the base. It is held in place by headed studs 33 in the base which pass through key-hole slots 34 in the flange 32. Suitable handles 35 may be provided on the cover.

The entire instrument is preferably made of lightweight materials and is not only light in weight but is small and compact in form.

Having thus described the invention, what is claimed as new and desired to be secured by Letters Patent, is:

1. A pelorus comprising a flat base, a plate slightly spaced from and generally parallel with the base, two levels mounted on the plate at right angles to each other, means for adjusting the plate with respect to the base to level the plate, an azimuth graduated dial and a compass graduated dial carried by the plate in parallelism therewith and concentrically and rotarily adjustable with respect to the plate and each other, and means for clamping the dials in adjusted position.

2. A pelorus comprising a flat base, a plate slightly spaced from and generally parallel with the base, a spring interposed between the plate and the base, a plurality of leveling screws adjustably connecting the plate and the base to permit the leveling of the plate, two levels mounted on the plate at right angles to each other, an azimuth graduated dial and a compass graduated dial carried by the plate in parallelism therewith and concentrically and rotarily adjustable with respect to the plate and each other, and means for clamping the dials in adjusted position.

3. A pelorus comprising a flat base, a plate slightly spaced from and generally parallel with the base, a compression helical spring seated centrally and vertically in the base, a vertical stud mounted centrally in the plate and having a lower conical end seated in the spring, three leveling screws passing through the plate and threaded into the base, two levels mounted on the plate at right angles to each other, an azimuth graduated dial and a compass graduated dial carried by the plate in parallelism therewith and concentrically and rotarily adjustable with respect to the plate and each other, and means for clamping the dials in adjusted position.

In testimony whereof, I have signed my name to this specification.

WILFRID O. WHITE.